(12) United States Patent
Luan et al.

(10) Patent No.: US 10,652,252 B2
(45) Date of Patent: May 12, 2020

(54) MACHINE LEARNING CLASSIFICATION USING MARKOV MODELING

(71) Applicant: Cylance Inc., Irvine, CA (US)

(72) Inventors: Jian Luan, Irvine, CA (US); Derek Soeder, Irvine, CA (US)

(73) Assignee: Cylance Inc., Irvine, CA (US)

( * ) Notice: Subject to any disclaimer, the term of this patent is extended or adjusted under 35 U.S.C. 154(b) by 142 days.

(21) Appl. No.: 15/716,284

(22) Filed: Sep. 26, 2017

(65) Prior Publication Data
US 2018/0097826 A1 Apr. 5, 2018

Related U.S. Application Data

(60) Provisional application No. 62/402,801, filed on Sep. 30, 2016.

(51) Int. Cl.
*H04L 29/06* (2006.01)
*G06N 3/04* (2006.01)
*G06N 20/00* (2019.01)
*G06F 21/56* (2013.01)
*G06N 7/00* (2006.01)

(52) U.S. Cl.
CPC ........ *H04L 63/1416* (2013.01); *G06F 21/565* (2013.01); *G06F 21/566* (2013.01); *G06N 3/04* (2013.01); *G06N 7/005* (2013.01); *G06N 20/00* (2019.01); *H04L 63/145* (2013.01)

(58) Field of Classification Search
CPC ... H04L 63/1416; H04L 63/145; G06N 7/005; G06N 20/00; G06N 3/04; G06F 21/565; G06F 21/566
USPC .......................................................... 726/23
See application file for complete search history.

(56) References Cited

U.S. PATENT DOCUMENTS

| | | | | |
|---|---|---|---|---|
| 7,237,009 | B1* | 6/2007 | Fung | G06Q 10/00 709/206 |
| 9,690,938 | B1* | 6/2017 | Saxe | G06F 21/563 |
| 2003/0115476 | A1* | 6/2003 | McKee | G06F 9/52 713/193 |
| 2010/0162400 | A1* | 6/2010 | Feeney | G06F 21/563 726/24 |
| 2017/0032275 | A1* | 2/2017 | Lytkin | G06F 16/24573 |

\* cited by examiner

*Primary Examiner* — Farid Homayounmehr
*Assistant Examiner* — Sanchit K Sarker
(74) *Attorney, Agent, or Firm* — Jones Day

(57) ABSTRACT

Systems, methods, and articles of manufacture, including computer program products, are provided for classification systems and methods using modeling. In some example embodiments, there is provided a system that includes at least one processor and at least one memory including program code which when executed by the at least one memory provides operations. The operations can include generating a representation of a sequence of sections of a file and/or determining, from a model including conditional probabilities, a probability for each transition between at least two sequential sections in the representation. The operations can further include classifying the file based on the probabilities for each transition.

38 Claims, 5 Drawing Sheets

MACHINE LEARNING CLASSIFICATION USING MARKOV MODELING

RELATED APPLICATION

This application claims priority to U.S. Pat. App. Ser. No. 62/402,801 filed Sep. 30, 2016, the contents of which are hereby fully incorporated by reference.

TECHNICAL FIELD

The subject matter described herein relates generally to machine learning classification systems and methods using Markov modeling.

BACKGROUND

In order to detect malicious software (e.g., viruses, worms, Trojan horses, spyware, and/or programming that gathers information about a computer/user without permission), computer systems may utilize file classification systems to identify files with certain characteristics which make it likely that the files are malicious. Although file classification systems are generally able to detect and/or prevent the execution of known malicious files, no system is capable of knowing whether every single file in existence is malicious or not. Thus, systems with a greater ability to predict and/or classify files as malicious and/or clean can be desirable.

SUMMARY

Systems, methods, and articles of manufacture, including computer program products, are provided for classification systems and methods using modeling. In some example embodiments, there is provided a system that includes at least one processor and at least one memory including program code which when executed by the at least one memory provides operations. The operations can include generating a representation of a sequence of sections of a file and/or determining, from a model including conditional probabilities, a probability for each transition between at least two sequential sections in the representation. The operations can further include classifying the file based on the probabilities for each transition.

In some variations, one or more features disclosed herein including the following features can optionally be included in any feasible combination. In various embodiments, the representation can include tokens, such as one or more of a letter, a number, a symbol, and a programmatic class. For example, the representation can include a string of characters, where a sequence of the characters corresponds to the sequence of the sections of the file. For example, the sequence of characters in the string can be generated such that each of the characters occurs in the same order as the order of the sections of the file. In some embodiments, classifying the file can mean classifying the file as an adware file, a parasitic file, a bad file, a packed file, and/or a good file. The operations can further include preventing execution of the file when the file is classified as a malicious file (e.g., an adware file, a parasitic file, and/or a bad file).

In some aspects, the conditional probabilities can include measured probabilities that a first file section will be followed by a second file section. For example, the conditional probabilities can be generated based on training files. In various aspects, the sections of the file can include a MAC header, a DOS header, rich data, a portable executable header, code, data, import data, export data, an entry point, a beginning indication, an end indication, and/or the like. The operations may further comprise determining a prior probability for a first section of the file occurring first (e.g., from a model including such probabilities), and classifying the file can be further based on the prior probability.

In some embodiments, the conditional probabilities can be included in a matrix or dictionary stored in memory, and/or determining the probabilities for each transition comprises retrieving a corresponding conditional probability from the matrix or dictionary, for each of the transitions. In some embodiments, the conditional probabilities can be generated based on Markov modeling. For example, the operations can further comprise generating a plurality of representations of a plurality of files with a known classification, and/or processing transitions between sections in each of the plurality of files to generate a matrix or dictionary of the conditional probabilities. The plurality of files can be compared against the matrix or dictionary to generate a score range for the known classification, and/or a score for the file can be generated based on the probabilities for each transition. Classifying the file can include classifying the file as belonging to the known classification when the score falls within the score range.

In some embodiments, the operations can further include generating a classification score based on a function of a product of the probabilities for each transition. Classifying the file can be based on comparing the classification score against a score (e.g., stored in memory) for one or more file classification types. The operations can include comparing each transition against conditional probabilities for a plurality of different classifications to generate a plurality of classification scores, and classifying the file as belonging to one or more of the plurality of different classifications can be based on the plurality of classification scores. The operations can further comprise determining, a probability of a transition between more than two sequential portions occurring in training files. In some aspects, the function can include a negative logarithm.

Implementations of the current subject matter can include, but are not limited to, methods consistent with the descriptions provided herein as well as articles that comprise a tangibly embodied machine-readable medium operable to cause one or more machines (e.g., computers, etc.) to result in operations implementing one or more of the described features. Similarly, computer systems are also described that may include one or more processors and one or more memories coupled to the one or more processors. A memory, which can include a non-transitory computer-readable or machine-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including but not limited to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes, it should be readily understood that such features are not intended to be limiting. The claims that follow this disclosure are intended to define the scope of the protected subject matter.

BRIEF DESCRIPTION OF THE DRAWINGS

The accompanying drawings, which are incorporated in and constitute a part of this specification, show certain aspects of the subject matter disclosed herein and, together with the description, help explain some of the principles associated with the disclosed implementations. In the drawings.

DETAILED DESCRIPTION

Figure 1:
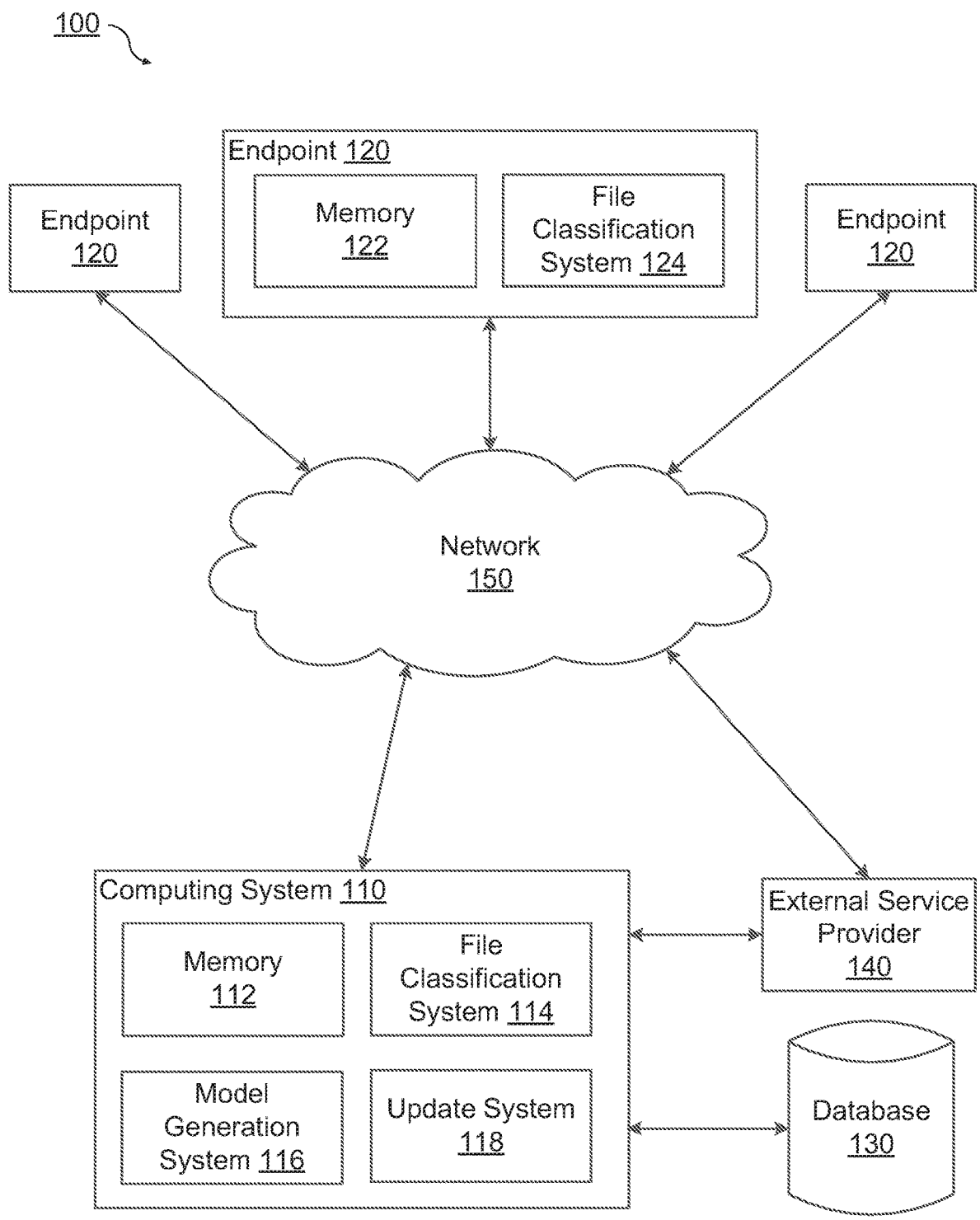
FIG. 1 illustrates an example of a system in which file classification and/or information retrieval solutions may be implemented, in accordance with some embodiments.

Users run software programs with a variety of capabilities on endpoints. An endpoint can include one or more of a personal computer, a smart phone, a tablet, and/or the like. Certain software programs and/or files can include malicious code (referred to herein as "malware"), which can be harmful to the user and/or the endpoint. Therefore, in order to protect themselves from malware, users can install or otherwise utilize malware detection software on or through the endpoint.

Computer programs are typically compiled to generate executable programs. The compilation process transforms the computer program from source code to object code. While source code is written in a high-level, human-readable programming language (e.g., C, Java), object code is in a binary format that is not immediately comprehensible. Although object code can be transformed into human-readable form in a process known as disassembly, a human operator cannot efficiently and reliably detect malicious computer programs by inspecting the disassembled object code.

However, in some aspects, attributes of computer programs or files may be derived from object code or may be predefined, and may be used to analyze and/or classify files. An attribute can refer to any salient data point that can be measured from a file. Attributes characterizing a file and/or the environment in which the file is being, read, downloaded, executed, written to, etc. can be collected or otherwise accessed. For example, binary files may be reviewed and/or classified based on one or more attributes associated with the file. Determined attributes can include binary attributes, integer attributes, and/or the like. For example, attributes can include information/indications relating to a file size, a number of file headers, a portable executable (PE) checksum, debugging, an operating system or image version, a number of sections, entropy of code sections, a number of resources, an entry point, registry keys, registry startup keys, networking related dynamic link libraries (DLL), and/or any characteristic of a file which may be relevant to classification of a file.

Once attributes of a file are determined, the file may be analyzed based on at least some of the attributes. Models/mapping can be used to estimate the likelihood of a file belonging to a particular class. For example, based upon where the files are mapped, the files may be classified as malicious, benign, clean, safe, suspect, unsafe, adware, spyware, parasitic, packed, and/or the like. As used herein, the terms "safe" and "unsafe" can refer to a machine-generated, relative classification based on an estimate of the danger presented by one or more files that could be a threat. In some embodiments, a relative threat score can be generated for a given file, which can be used to classify the file as safe or unsafe. Other classification protocols with more than two divisions are also within the scope of the current subject matter. In non-limiting examples, threat score outputs from one or more machine learning threat discernment models can be used to classify potential threats in several categories (e.g., malicious, benign, clean, safe, suspect, unsafe, adware, spyware, parasitic, packed, and/or the like).

Machine learning and/or predictive modeling may be utilized to increase the accuracy of these classifications, as described herein. For example, in some aspects, a convolutional neural network (CNN) can be utilized to analyze the disassembled binary file including by applying a plurality of kernels adapted to detect certain sequences of instructions in the disassembled binary file. In some implementations, a CNN can be trained to detect malware by applying one or more supervised learning and/or optimization techniques. For instance, training a convolutional neural network can include utilizing the CNN to process a plurality of training files. The training files can be disassembled binary files with known classifications (e.g., as malicious, benign, clean, safe, suspect, unsafe, adware, spyware, parasitic, packed, and/or the like), and the convolutional neural network can be utilized to process training files and generate corresponding training outputs.

For example, samples can be analyzed to provide predictive outputs regarding the likelihood of a given file being a threat and/or a specific classification. Samples can refer to any piece of data upon which classifying or similarity analysis operations against similar samples can be performed.

Training the convolutional neural network can include applying one or more supervised learning and/or optimization techniques to minimize the error associated with the training outputs (e.g., relative to the known classifications). In some embodiments, a trained convolutional neural network can be provided to detect malicious executables by determining classifications of unknown disassembled binary files.

In some aspects, based upon a classification (e.g., based upon processing a file with a model) a decision can be made as to whether or not to provide a notification and/or allow the file to execute, be downloaded, opened, and/or the like. If it is determined that the file should not execute or some other action with the file should be prevented, a process or module can take action to prevent the file from executing, opening, continuing to execute, writing, being downloaded, and/or the like. In some implementations, the file can be quarantined if it is assessed as a potential threat.

By carefully selecting and training the machine learning threat discernment models in an ensemble of such models, a threat discernment system can act resiliently against change over time, accommodating small and large changes in program behaviors that resemble "safety" or a lack thereof. Machine learning threat discernment models may be characterized by one or more algorithms incorporated therein, which may include, as illustrative examples, neural networks, support vector machines, logistic regression models, Bayesian algorithms, and decision trees. Consistent with the current subject matter, machine learning models can be implemented as both cloud-based instances and locally running instances (e.g., at one or more endpoint computer of a user and/or an organization).

FIG. 1 illustrates an example of a system 100 in which file classification and/or information retrieval solutions may be implemented, in accordance with some embodiments. As illustrated, an endpoint 120 may communicate with other endpoints 120, a computing system 110, and/or an external service provider 140 through the use of a network 150. The endpoint 120 may include one or more of a phone, mobile device, tablet, personal computer, or other device. In accordance with various embodiments, the endpoint 120 may operate according to an iOS, Android, Mac, Windows, Linux, or another operating system. The network 150 can include one or more of a local area network (LAN), a wireless LAN (WLAN), a personal area network (PAN), a wide area network (WAN), a cellular network, the internet, and/or the like. In some aspects, an endpoint 120 may communicate directly with other devices through Bluetooth (e.g., low energy) communications, Near-field communications (NFC), ZigBee communications, a universal serial bus (USB), wireless USB, device-to-device communications, and/or the like.

As further illustrated, an endpoint can include a memory 122 and a file classification system 124. The memory 122 can be configured to hold a plurality of files, in addition to executable software for controlling the operation of the endpoint 120. The file classification system 124 may include software and/or hardware components, and may be configured to operate in accordance with the procedures described herein. For example, in various embodiments, the file classification system 124 may be configured to classify a plurality of files as malicious, benign, clean, safe, suspect, unsafe, adware, spyware, parasitic, packed, and/or the like. In some embodiments, the file classification system 124 may be configured to classify files in more than one manner and/or according to a sliding scale of how good or bad a file may be.

As further illustrated, the computing system 110 can include a memory 112, a file classification system 114, a model generation system 116, and/or an update system 118. Similar to above, the memory 112 may be configured to store a plurality of files and/or software for controlling operation of the computing system 110. In some aspects, the computing system 110 may be in communication with a database 130, and can additionally or alternatively use the database 130 for file storage. Although illustrated separately, the computing system 110 can operate as a server which includes the database 130.

The file classification system 114 may be similar to the file classification system 124 on the endpoint, in that the file classification system 114 may be configured to process and/or classify files (e.g., as malicious, benign, clean, safe, suspect, unsafe, adware, spyware, parasitic, packed, and/or the like). However, in some aspects the file classification system 114 may include additional functionalities which are not present on the file classification system 124 of the endpoint 120, such as an ability to process files from multiple endpoints 120 and/or utilize machine learning to more appropriately classify files. In some embodiments, the file classification system 124 on the endpoint 120 may not be configured to process as much information as the file classification system 114 of the computing system 110, which can save valuable processing resources for other processes running on the endpoint 120.

In various embodiments, either or both of the file classification systems 114, 124 can be configured to utilize Markov chains to identify and/or classify files. As referred to herein, a Markov chain can be a stochastic model describing a sequence of possible events in which the probability of each event depends on the previous event(s). A Markov chain can describe how events change from one state to another state. For example, there may be three states of weather (Sunny, Cloudy, and Rainy) in California. One use of a Markov chain is to calculate how likely a weather state will occur next, given the current weather state. For example, if today is Sunny, the probability that tomorrow's weather is Sunny might be 95%, Cloudy might be 4%, and Rainy might be 1%. If today is Rainy, tomorrow's probability of being Sunny can be 60%, Cloudy can be 3%, and Rainy again can be 37%. These probabilities can be derived from past observations. In some embodiments, the model generation system 116 can be configured to generate a model, such as a Markov chain, for use by one or both of the file classification systems 114, 124. For example, based on files with known classifications (e.g., malicious, benign, clean, safe, suspect, unsafe, adware, spyware, parasitic, packed, and/or the like), the model generation system 116 may generate one or more Markov chain to predict the probability that an unknown file fits within a specific classification. Additional details on the generation and use of such models are provided below.

In order to provide updates to the file classification system 124 at the endpoint 120, the computing system 110 may utilize an update system 118. For example, the update system 118 may be configured to provide patches containing information on a current set of Markov chains/models to the endpoint 120. Thus, the endpoint 120 may be able to stay up to date and increase the likelihood of preventing an attack (e.g., prevent the endpoint 120 from opening a worm, Trojan horse, spyware, and/or the like as the computing system 110 accounts for their possible existence).

In some implementations, the computing system 110 can communicate with an external service provider 140. For example, the computing system 110 can communicate directly with the external service provider 140 and/or may communicate over the network 150 with the external service provider 140. The external service provider 140 can be configured to receive information and/or provide information in order to provide a software/application/processing service to the computing system 110 and/or an endpoint 120. For example, in some aspects, the external service provider 140 can provide additional functionalities which the computing system 110 may not be enabled to perform.

Figure 2:
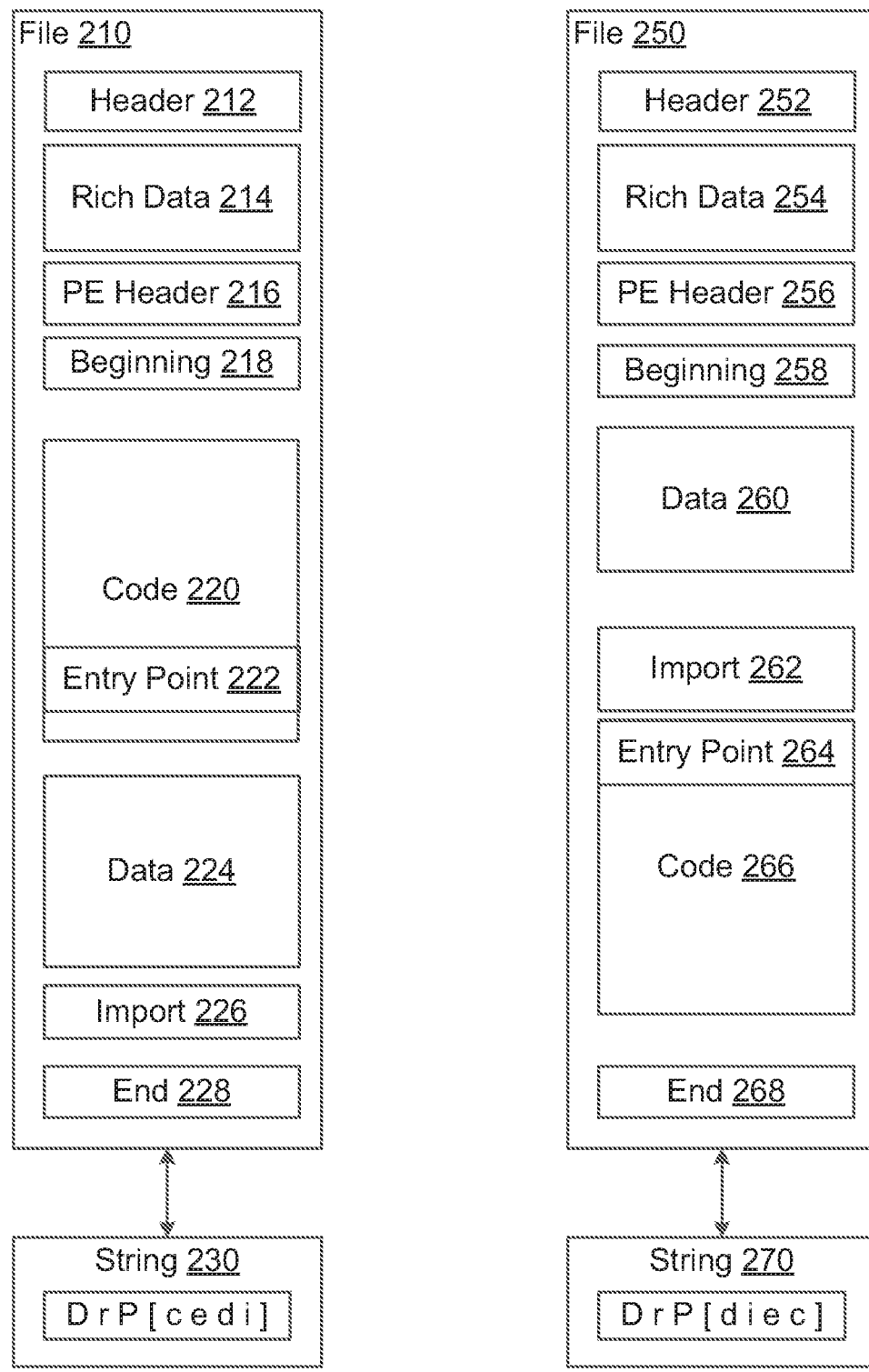
FIG. 2 illustrates an example mapping of two files into corresponding strings.

FIG. 2 illustrates an example mapping 200 of two files 210, 250 into corresponding strings 230, 270. As illustrated, the file 210 can include at least a header 212 (e.g., a Dos or Mac Header), followed by rich data 214, followed by a portable executable (PE) header 216, followed by a beginning indication 218, followed by code 220, which includes an entry point 222, followed by data 224, followed by import data 226, followed by an end indication 228. Each of these items may be referred to herein as "sections" of the file 210. As illustrated, the file 250 can include at least a header 252, followed by rich data 254, followed by a PE header 256, followed by a beginning indication 258, followed by data 260, followed by import data 262, followed by an entry point 264 at the start of code 266, followed by an end indication 268. As above, each of these items may be referred to herein as sections of the file 250.

In some aspects, the particular location of one or more of the sections of the files 210, 250 may be indicative of a classification of the file 210, 250 (e.g., malicious, benign, clean, safe, suspect, unsafe, adware, spyware, parasitic, packed, and/or the like). For example, having the entry point 264 soon after the import data 262 can be typical in adware and/or atypical in clean files, which can tend to indicate that the file 250 is adware and not a clean file. However, it may be possible that many adware files do not include this sequence/proximity and/or many clean files do include this sequence/proximity. Therefore, more detailed analysis of the files 210, 250 may be necessary.

In some embodiments, based upon the contents and/or relative location of each of the sections of the files 210, 250, string 230, 270 representations may be generated, respectively. As illustrated, the header 212 can be represented by 'D', the rich data 214 can be represented by 'r', the PE header 216 can be represented by 'P', the beginning indication 218 can be represented by '[', the code 220 can be represented by 'c', the entry point 222 can be represented by 'e', the data 224 can be represented by 'd', the import data 226 can be represented by 'i', and/or the end indication 228 can be represented by ']'. Thus, the file 210 may be represented by the string 230 of "DrP[cedi]". Similarly, the file 250 may be represented by the string 270 or "DrP[diec]". In some aspects, the files 210, 250 can correspond to PE files.

In the event that there is a "tie" between two or more sections of a file (e.g., two sections of a file begin, end, or are otherwise present within the same, or approximately the same, place in a file), the corresponding representations of the two or more sections can be organized alphabetically. For example, the entry point 264 may occur at the start of the code 266. Therefore, the string 270 can include "ce" to represent these two sections, instead of the illustrated "ec". Once the strings 230, 270 are generated, they may be analyzed and/or used to generate a Markov chain, as described herein.

One or more of the sections of the files 210, 250 can include a name, an offset within the file, a virtual address to copy to, the size of the section in the file, the size of section in virtual memory, and/or the like. In some embodiments, the generation of the strings 230, 270 can be based upon the order of sections of the files 210, 250 themselves, or based upon the order of the files 210, 250 as they exist in memory. For example, a digital signature may be present within the file 210 (e.g., in the original construction of the file), but this information may not be stored in memory along with/as part of the file 210. Similarly, additional information may be added to and/or stored with the file 210 in memory and/or at runtime.

In various embodiments, a "virtual ordering" may be indicated in the file 210. As used herein, virtual ordering can refer to an order in which the sections of the file will occur in memory (e.g., during execution). Accordingly, in some aspects, the virtual ordering can be consulted to determine the characters used in the string 230, 270 representations of the files 210, 250. This virtual ordering of the sections of the files 210, 250 can act like a fingerprint of the files 210, 250. Using the order of the sections of the files 210, 250 in memory can be beneficial, as files stored in memory (e.g., during execution) and/or loaded and prepared for execution can contain more or less information, compared to files stored in non-executing representation, static representation, at rest, and/or the like. In some aspects, analyzing files 210, 250 as they occur outside of memory (e.g., in permanent storage, not executing, etc.) can provide one solution, and/or analyzing files 210, 250 as they are stored in memory (e.g., at runtime) can provide another solution. These solutions can be used together or individually in order to classify a file, as described herein.

Although specific sections and specific sequences of sections of the files 210, 250 are described, additional/alternative sections may be present and/or added to the string 230, 270 representations thereof. For example, export data may be present within a file, which can be represented by 'x'. Similarly, although specific representations of sections of the files are described, alternative representations are possible. For example, in some aspects, instead of a string of characters, a set of tokens can be used. A token can include any number of characters, numbers, symbols, predetermined classes, and/or the like. A predetermined class can include a set of defined properties, functions, calls, data, attributes, and/or the like. For example, a predetermined class can be used to represent each of the sections of the files 210, 250. This can include one or more characters, numbers, and/or symbols which indicate a specific section type (e.g., import data 226). A set of predetermined classes can be used to classify a file, similar to the classification procedures described herein with respect to strings. In some aspects, a predetermined class can represent more than one section at a time.

In some embodiments, one or more of the sections of the files 210, 250 may be ignored and/or not represented in the strings 230, 270. For example, because most files start with a header, the headers 212, 252 may not be represented in the corresponding strings 230, 270 (e.g., the may not be present). Similarly, if a particular ordering and/or presence of specific sections of the files 210, 250 is determined to not be relevant or statistically significant, they may be ignored and/or not represented in the corresponding strings 230, 270. The determination of what sections of files may be converted into a corresponding string representation can be manually adjusted and/or controlled through machine learning.

Figure 3:
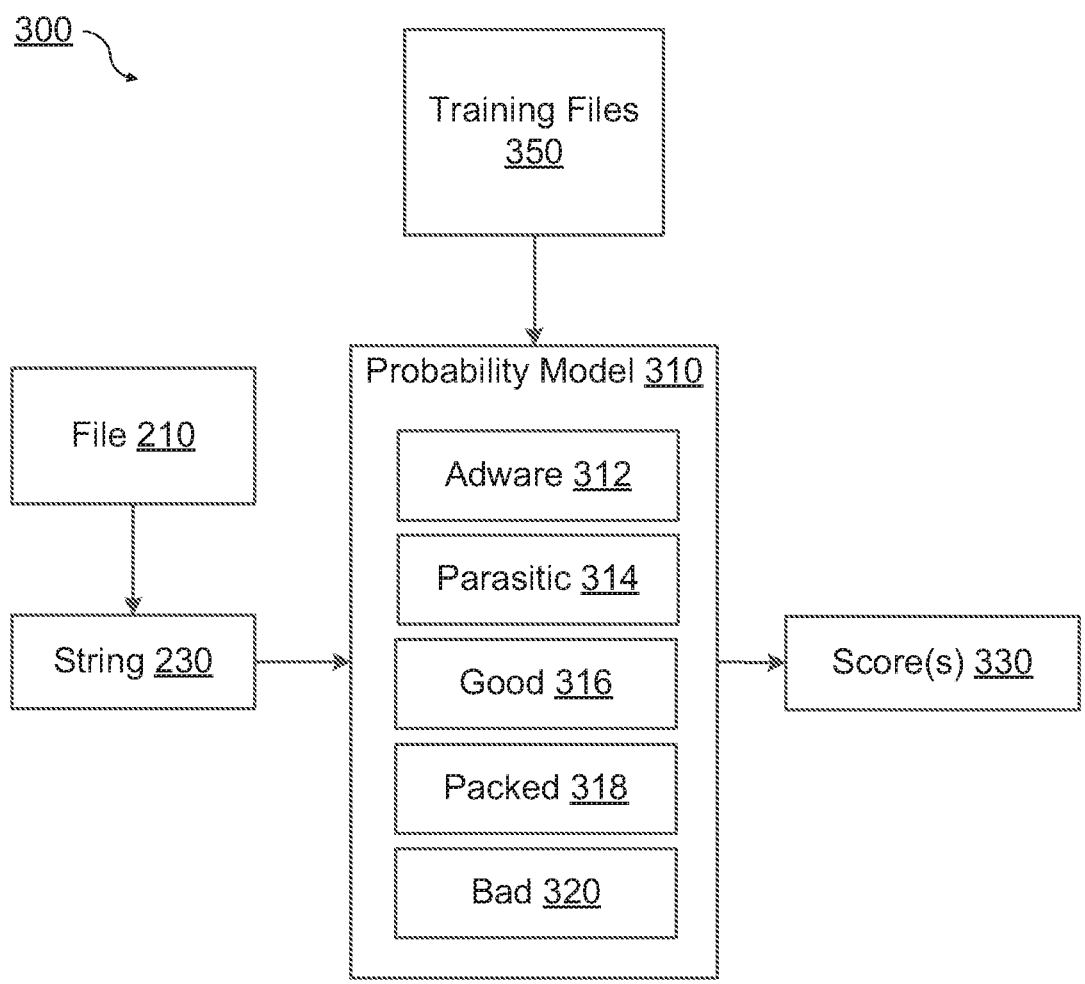
FIG. 3 illustrates an example system for classifying one or more files, in accordance with some embodiments.

FIG. 3 illustrates an example system 300 for classifying one or more files 210, in accordance with some embodiments. As illustrated, file 210 may be mapped to the string 230 representation (similar to the mapping 200 FIG. 2), and the string 230 may be processed by a probability model 310. As illustrated, probability model 310 can include an adware model 312, a parasitic model 314, a good model 316, a packed model 318, and/or a bad model 320. In various embodiments, each of these models 312-320 can be used to predict a probability that the file 210, for example, is an adware file, a parasitic file, a good file, a packed file, and/or a bad file.

In some aspects, the organization of a packed file can be similar to a parasitic file, and therefore providing a separate model for each can be advantageous (e.g., to avoid misclassification of malicious/bad or non-malicious/good files). As referred to herein, a packed file can be similar to a compressed file, where sections of an original file may be altered and/or rearranged to form a compressed file, which may take up less space in memory. A parasitic file can be a file which attaches itself to another file and modifies the file in a malicious way (e.g., configures itself to run when the file is opened in order to perform actions on an endpoint 120). In some aspects, a parasitic file can be a virus.

Although five specific models are described, in various embodiments, more or less models may be utilized, such as models for malicious files, benign files, clean files, safe files, suspect files, unsafe files, spyware files, and/or the like. In various aspects, the file 210 may be properly classified as being more than one "type" of file.

In some embodiments, the probability model 310 may be generated based at least in part on analyzing training files 350. For example, representations, such as strings, may be generated for each of the training files 350, which represent at least some of the sections of the files. Thereafter, a probability of each section observed first can be calculated and/or stored. For example, a determination may be made of how often an 'r' section occurs first. Similarly, the sequence of the individual sections of the files may be analyzed to determine the probability that one section follows another section. For example, a determination may be made of how often an 'r' is followed by a 'P', how often a 'P' is followed by a '[', how often a '[' is followed by a 'c', and so on. These probabilities can be stored in the probability model 310 for later comparison against a file to determine a classification of the file. For example, after analyzing a plurality of files (e.g., hundreds, thousands, millions, etc.), the following probabilities may be determined and/or stored in the probability model 310, where "X" by itself represents the probability that section type X will occur as the first (evaluated) section in a file, and where "X→Y" represents the probability that section type Y will occur after section type X.

r=0.01
r→P=0.05
P→[=0.20
[→c=0.001
c→e=0.02
e→d=0.075
d→i=0.01
i→]=0.03

The probability that the file 210 is of a certain classification can be represented by the function: score=−log $(Y_0\Pi_{i=0}^{n}Y_i)$, where $Y_i$ is the probability of element i being followed by element i+1, and $Y_0$ is the probability of seeing the first character. Therefore, the score representative of the probability that the file 210 is of a certain classification can equal −log(0.01*0.05*0.20*0.001*0.02*0.075*0.01*0.03), which equals approximately −13.3468. In some aspects, $\log_2$ may be used instead of $\log_{10}$, making the score approximately −44.3371. Similarly, a positive log can be used. In accordance with these examples, the probability D→r might not be used because Mac/Dos headers may be the first section of the majority of files. However, in various embodiments, the probability D→r may be used, which may depend upon the specific file classification being analyzed. In various embodiments, functions other than the logarithm may be used, such as any other function of $Y_0\Pi_{i=0}^{n}Y_i$. In some aspects, $Y_0$ might not be used to calculate the score.

Whatever method is used, the calculated value can correspond to the score 330, which may be used to determine whether or not the file 210 should be considered as falling within a certain classification. Although not illustrated, multiple scores 330 can be created for the file 210. For example, in analyzing the file 210, the adware model 312 can return a score of '−13.0', the parasitic model 314 can return a score of '−3.45', and the good model 316 can return a score of '−0.7'. In some aspects, the closer to '0' a score is, the more likely the file 210 belongs to that classification. For example, the scores can be used as hints to indicate (e.g., to another machine learning model) a probability that the file 210 belongs to one or more classification. Based upon what is normally seen (e.g., by the other machine learning model) with other files of each classification type, a determination can be made/returned that the file 210 belongs to a specific classification type.

In some aspects, a determination that the file 210 belongs to a specific classification type can be made based on which of a plurality of scores 330 is the lowest (e.g., when $\log(Y_0\Pi_{i=0}^{n}Y_i)$ is used) or the highest (e.g., when −log $(Y_0\Pi_{i=0}^{n}Y_i)$ or $Y_0\Pi_{i=0}^{n}Y_i$ is used). The plurality of scores can be generated by processing the file 210 using each of the adware model 312, the parasitic model 314, the good model 316, the packed model 318, the bad model 320 and/or the like. In some embodiments, the file 210 can be classified as belonging to more than one classification type depending upon the highest/lowest scores 330, the proximity of the scored 330 to each other, and/or the proximity of the scores 330 to other files with known classifications (e.g., adware, parasitic, good, packed, bad, and/or the like).

In some embodiments, the score(s) 330 can be compared against range(s) to determine whether the file 210 is of a certain classification type. For example, if a score 330 is between a range of '0' and '−15.0,' (e.g., greater than zero and/or less than or equal to negative fifteen) then the file may be classified as being more likely to belong to a specific file classification (e.g., adware, parasitic, good, packed, and/or bad). In some aspects, each model used can produce a value within the range of '0' to '15'. However, in some embodiments, disparate range(s) for the score(s) 330 for each file type can be stored in a reference table, and/or the like. In some aspects, the reference table/code can include thresholds and/or ranges of values, for each classification type, which indicate whether the file 210 should be considered as being part of that classification type.

In some embodiments, the probabilities of sections preceding/following each other, and/or the probabilities of a section occurring first can be stored as a matrix or dictionary; referred to herein generically as "models." Thus, the probability model 310 can be represented as a matrix and/or dictionary for all file types. If a dictionary is used, the dictionary can have entries for each possible transition, and the likelihood that the corresponding transition occurs. Each entry can be defined by two or more tokens (e.g., characters), such that a transition probability may be looked up by providing the two or more tokens as inputs to the dictionary. Similarly, the dictionary (or some other storage/reference means, such as a list) can include entries for each individual token, such that a "prior probability" of the token occurring first may be looked up by providing the individual token as an input to the dictionary. In the event that probabilities for different file classification types are used, each of the adware model 312, parasitic model 314, good model 316, packed model 318, and/or bad model 320 can be represented as their own matrix (or matrices) and/or dictionary (or dictionaries). In some aspects, the matrices and/or dictionaries can be generated through Markov modeling.

In some embodiments, the training files 350 may already be classified as one or more of an adware file, a parasitic file, a good file, a packed file, a bad file, and/or the like. At least a portion of the files of each classification type may be analyzed to generate a model corresponding to that classification. For example, a plurality of known adware files can be processed to generate the adware model 312, a plurality of known parasitic files can be processed to generate the parasitic model 314, and so on. In various embodiments, processing a file can refer to generating a representation of at least some of the sections of the file (e.g., a string of characters) and/or noting the occurrence of each transition between two sequential sections. The noted (e.g., stored)

occurrence of each transition can be compared against the non-occurrence of the transition and/or used to calculate a probability for the transition. For example, if the sequence "ie" occurs 100 times among 10,000 files containing an 'i' section, then the probability i→e can be set to equal 0.01 (e.g., 100/10,000). Additionally, processing a file can include noting the occurrence of each first-occurring section and calculating corresponding prior probabilities. For example, if the 'r' section occurs first 1,000 times among 100,000 files, then the probability 'r' can be set to equal 0.01 (e.g., 1,000/100,000). This procedure may be performed for each file classification type and/or for a plurality of files, regardless of classification type.

In various embodiments, the training files 350 can be processed by the probability model 310 (and/or any of the sub-models) to generate an estimated score 330 for each classification type. For example, once a plurality of training files 350 known to be of a packed classification type are used to generate the packed model 318, those same files may be run through the packed model 318 to determine a score 330 for each file. The scores 330 may then be utilized as a reference point for unknown files. In some embodiments, the scores can be represented in the form of a range, average, mean, median, mode, and/or the like, or some combination thereof. Therefore, when an unknown file 210, for example, is processed, it may be converted into a string 230 representation and compared against transition probabilities to generate one or more scores 330, which can be compared against stored probability information to classify the file 210 according to one or more classification type. Using a simple representation (e.g., strings) of the sections of files can make it easier and/or less computationally intensive to compare positions of the sections, and thereby easier and/or less computationally intensive to classify files. However, in some aspects, an intermediate representation of the file 210 may not be necessary. For example, the virtual ordering in the file 210 can be processed, and the first section and/or transition probabilities can be derived based on comparing the observed section against the probability model 310.

In some embodiments, when the file 210 is processed by the probability model 310 to generate the score, the string 230 can be processed based on probabilities that are common to more than one file type (e.g., all file types) and/or probabilities for specific file types. For example, the string 230 may be compared against a general model of the probability model 310 (e.g., one or more dictionaries generated across multiple classification types), and/or models for each of the adware model 312, parasitic model 314, good model 316, packed model 318, and/or bad model 320. Based upon the comparisons, one or more scores 330 can be generated, as described herein. In some aspects, a combined score 330 can be used and/or individual scores for each file classification (as well as the general score) can be used to determine whether a file should be classified in a particular manner. In some embodiments, a recursive neural network, such as a land change modeler (LCM), may be used to train probabilities.

In some aspects, a probability of zero might not be used. For example, if the file 210 contained the sequence "[ ]", but the probability model 310 has never seen this sequence, then the probability model 310 may set/use a corresponding probability of a very low number (e.g., 0.000000001). This probability can be set after the probability model 310 is generated, and certain sequences have not been encountered (e.g., none of the training files 350 contained the sequence). Doing so can help to avoid a log(0) calculation. In some aspects, this might be more common on a per classification basis, such as when the adware model 312 has never seen an adware file with this sequence, but maybe the parasitic model 314 has seen parasitic files with this sequence.

In some aspects, the probability model 310 can be generated such that it includes measured probabilities of one or more section following a combination of sections, or vice versa. For example, the probabilities "rP→[", "P[→c", "[→ce", "[→ced", "ce→di", "di→]" and/or the like may be additionally or alternatively used to generate the score 330 for the file 210. In some aspects, first order, second order, and/or third order probabilities can be calculated and used for file classification. First order can refer to comparing transitions of an individual token to another individual token (e.g., "X→Y", "Y→Z", and so on). Second order can refer to comparing transitions of tow tokens to another individual token (e.g., "AB→C", "BC→D", and so on). Similarly, third order can refer to comparing transitions of three tokens to another individual token (e.g., "LMN→O", "MNO→P", and so on). In some embodiments, higher or lower ordered analysis can be weighted more heavily, depending upon the classification type in question. For example, second order probabilities may be more useful for adware file, whereas third order probabilities may be more useful for parasitic files. In some aspects, one or more score generated from among different higher or lower ordered analysis can be considered separately or together (e.g., weighted equally or differently) in determining whether a file should be classified in a certain manner. Although three different orders or discussed, more or less may be used. Although this analysis may be more complicated, it can offer more valuable information, at least for a portion of the file classification types.

Although only one specific file 210 is discussed at times, multiple files may be converted into strings and processed through the probability model 310. In some embodiments, the score(s) 330 may be only one of a plurality of features used to classify the file 210.

Figure 4:
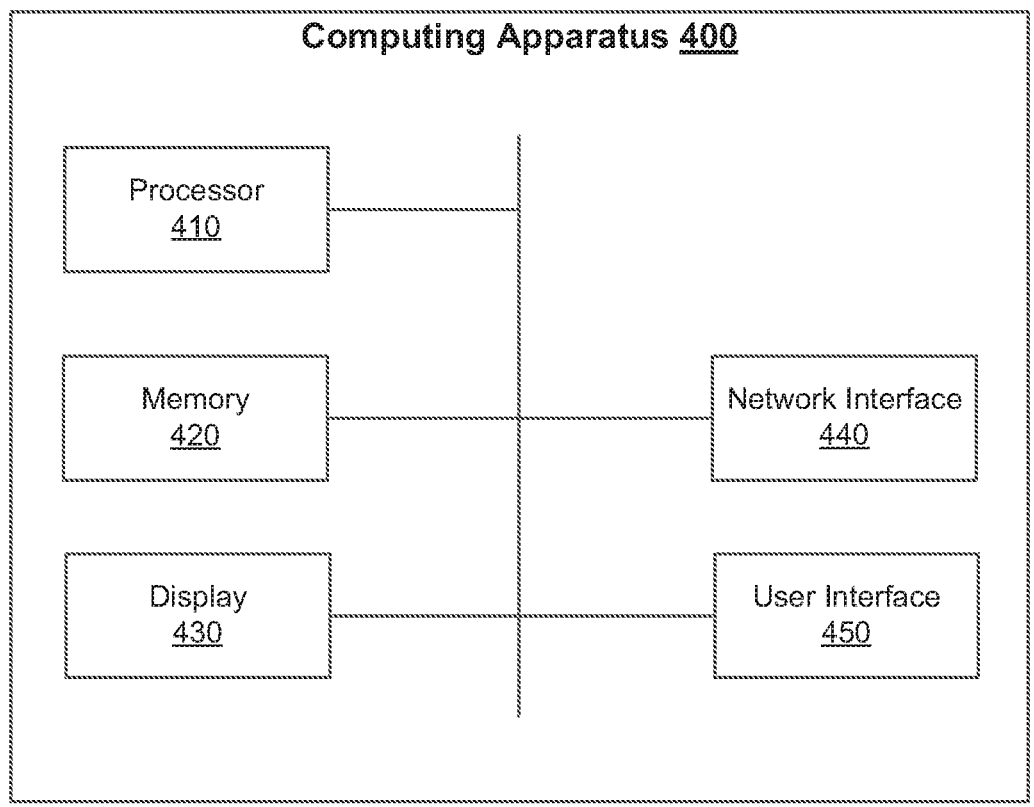
FIG. 4 illustrates an example of a computing apparatus, in accordance with various embodiments.

FIG. 4 illustrates an example of a computing apparatus 400, in accordance with various embodiments. An apparatus consistent with at least a portion of the computing apparatus 400 may be used to implement one or more of the endpoints 120, the computing system 110, the database 130, and/or the external service provider 140. In some aspects, the computing apparatus 400 may be used to perform at least some of the processes described herein.

As illustrated, the computing apparatus 400 may include one or more processors such as processor 410 to execute instructions that may implement operations consistent with those described herein. The computing apparatus 400 may include memory 420 to store executable instructions and/or information. Memory 420 may include solid-state memory, solid-state disk drives, magnetic disk drives, or any other information storage device. Memory 420 may provide storage for at least a portion of a database. The computing apparatus 400 may include one or more displays, such as display 430. As illustrated, the computing apparatus 400 may also include a network interface 440 to a wired network or a wireless network, such as the network 150 of FIG. 2. Wireless networks may include WiFi, WiMax, and cellular networks (2G/3G/4G/5G), and/or any other wireless network. The computing apparatus 400 may include one or more user interface, such as user interface 450. The user interface 450 can include hardware or software interfaces, such as a keyboard, mouse, or other interface that may include a touchscreen integrated with a display 430.

Figure 5:
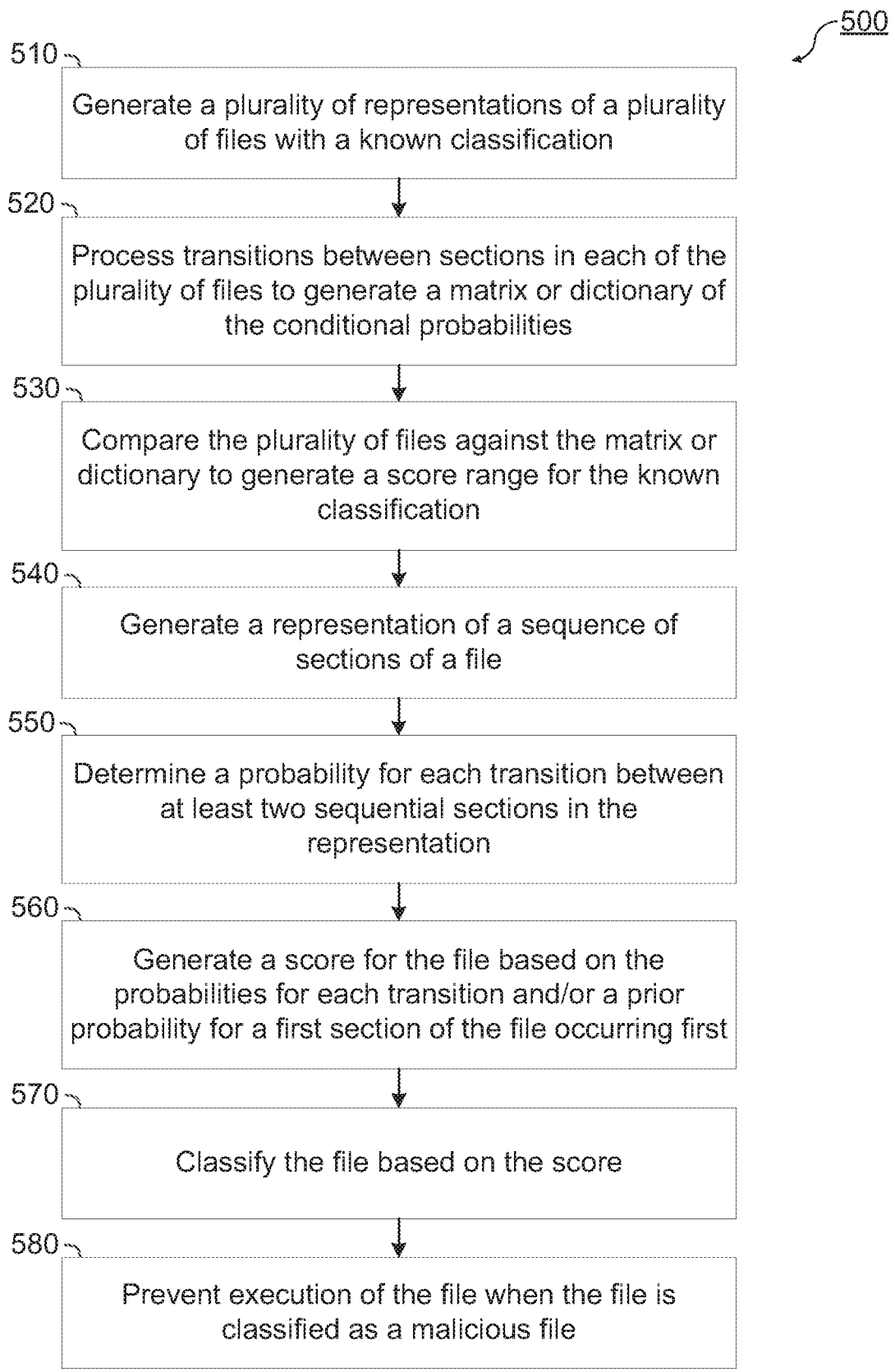
FIG. 5 illustrates an example of a method for classifying files, in accordance with various embodiments.

FIG. 5 illustrates an example of a method 500 for classifying files, in accordance with various embodiments. Although method 500 is illustrated as having a specific operational flow, two or more steps may be combined into a single step, a single step may be performed in one or more steps, one or more of the illustrated steps may not be present in various implementations, and/or additional steps not illustrated may be part of the method 500. In various embodiments, the method 500 may be performed by one or more of an endpoint 120, the computing system 110, the database 130, the external service provider 140, the computing apparatus 400, and/or portions thereof, such as one or more of the file classification systems 114, 124 and/or the model generation system 116. In some aspects, the computing apparatus 400 may be regarded as a server.

Method 500 may start at operational block 510 where the apparatus 400, for example, generates a plurality of representations of a plurality of files with a known classification. For example, the sections of the file(s) can comprise one or more of a MAC header, a DOS header, rich data, a portable executable header, code, data, import data, export data, an entry point, a beginning indication, and an end indication, and/or the like. In some embodiments, the representations can comprises tokens, such a one or more of a letter, a number, a symbol, a programmatic class, and/or the like.

Method 500 may next proceed to operational block 520 where the apparatus 400, for example, processes transitions between sections in each of the plurality of files to generate a matrix or dictionary (or any other data structure, such as a list) of the conditional probabilities.

Method 500 may next proceed to operational block 530 where the apparatus 400, for example, compares the plurality of files against the matrix or dictionary to generate a score range for the known classification. In some aspects, the score range can be predetermined (e.g., programmed into code) and/or can be controlled through machine learning.

Method 500 may next proceed to operational block 540 where the apparatus 400, for example, generates a representation of a sequence of sections of a file. In various embodiments, the representation can include a string comprising a sequence of characters corresponding to the sequence of the sections of the file. In some aspects, the sequence of characters in the string can be generated such that each of the characters occurs in the same order as an order of the sections of the file.

Method 500 may next proceed to operational block 550 where the apparatus 400, for example, determines a probability for each transition between at least two sequential sections in the representation. The probabilities can be determined from a model including conditional probabilities. The conditional probabilities can comprise measured probabilities that a first file section will be followed by a second file section. In some embodiments, the conditional probabilities can be generated based on training files. In various embodiments, the conditional probabilities can be included in a matrix or dictionary stored in memory, and determining the probabilities for each transition can involve retrieving a corresponding conditional probability from the matrix or dictionary, for each of the transitions. In some aspects, the conditional probabilities can be generated based on Markov modeling.

Method 500 may next proceed to operational block 560 where the apparatus 400, for example, generates a score for the file based on the probabilities for each transition and/or a prior probability for a first section of the file occurring first. In some embodiments, generating a classification score can be based on a function of a product of the probabilities for each transition and/or the prior probability (e.g., a negative logarithm).

Method 500 may next proceed to operational block 570 where the apparatus 400, for example, classifies the file based on the score. For example, in some aspects, the generated score can be compared against a range, and if the score falls within the range, the file is classified as belonging to a certain classification type. In some embodiments, the score can be evaluated based upon its proximity to zero (e.g., when a logarithmic formula is used), its proximity to one (e.g., when multiplication of probabilities is used), and or the like. The closer that the score is to the value, the more likely a file belongs to a certain classification. In some aspects, the file can be classified as one or more of an adware file, a parasitic file, a bad file, a packed file, a good file, and/or the like.

Method 500 may next proceed to operational block 580 where the apparatus 400, for example, prevents execution of the file when the file is classified as a malicious file. For example, the file may be considered malicious when it is classified as at least one of an adware file, a parasitic file, a bad file, and/or the like.

Additionally or alternatively, method 500 can include the apparatus 400, for example, determining a prior probability for a first section of the file occurring first. The prior probability can be determined from a second model including probabilities. In some aspects, the model with conditional probabilities and the model with prior probabilities can be the same, different, combined or connected in some manner, and/or the like. In some aspects, method 500 can additionally or alternatively include the apparatus 400, for example, determining a probability of a transition between more than two sequential portions occurring in training files, for each transition between more than two sequential portions.

In some embodiments, method 500 can include the apparatus 400, for example, comparing the plurality of files against the matrix or dictionary to generate a score range for the known classification. These score ranges can be stored (e.g., in a matrix, dictionary, and/or the like) for later reference/comparison. In related aspects, classifying the file can include classifying the file as belonging to the known classification when the score falls within the score range. In some embodiments, method 500 can additionally or alternatively include the apparatus 400, for example, comparing each transition against conditional probabilities for a plurality of different classifications to generate a plurality of classification scores, and/or classifying the file as belonging to one or more of the plurality of different classifications based on the plurality of classification scores.

One or more aspects or features of the subject matter described herein can be realized in digital electronic circuitry, integrated circuitry, specially designed ASICs, field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system can include clients and servers. A client and server are generally remote from each other and typically interact through a communication network. The relationship of client and server arises by virtue of computer programs running on the respective computers and having a client-server relationship to each other.

These computer programs, which can also be referred to programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user can be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital MRI image capture devices and associated interpretation software, and the like. As used herein, the term "module" refers to software functionality that can be implemented via one or more programmable processors that are part of one or more computing systems.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims, is intended to mean "based on at least" and/or "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations can be within the scope of the following claims.

The invention claimed is:

1. A method for implementation by one or more processors forming part of at least one computing device, the method comprising:
   generating a representation of a sequence of sections of a file;
   determining, from a model including conditional probabilities, a probability for each transition between at least two sequential sections in the representation, the model being trained using a recursive neural network; and
   classifying the file based on the probabilities for each transition;
   wherein:
      the representation comprises a string of alphanumeric characters in which each character in the string corresponds to a different section of the file within the sequence;
      the sequence of the sections of the file are arranged according to a virtual ordering, the virtual ordering representing an order in which the sections of the file will occur in memory, the generated sequence of the sections of the file being different than an order in which at least a portion of the sections occur within the file when not executing.

2. The method of claim 1 further comprising:
   preventing execution of the file, when the file is classified as a malicious file.

3. The method of claim 2, wherein the malicious file comprises at least one of an adware file, a parasitic file, and a bad file.

4. The method of claim 1, wherein the classifying comprises classifying the file as one or more of an adware file, a parasitic file, a bad file, a packed file, and a good file.

5. The method of claim 1, wherein the conditional probabilities comprise measured probabilities that a first file section will be followed by a second file section.

6. The method of claim 1, wherein the conditional probabilities are generated based on training files.

7. The method of claim 1 further comprising:
   determining, from a second model including probabilities, a prior probability for a first section of the file occurring first, wherein classifying the file is further based on the prior probability.

8. The method of claim 1, wherein the sequence of characters in the string are generated such that each of the characters occurs in the same order as an order of the sections of the file.

9. The method of claim 1, wherein the conditional probabilities are included in a matrix or dictionary stored in memory, and wherein determining the probabilities for each transition comprises retrieving, for each of the transitions, a corresponding conditional probability from the matrix or dictionary.

10. The method of claim 1, wherein the conditional probabilities are generated based on Markov modeling.

11. The method of claim 1, wherein the sections of the file comprise one or more of a MAC header, a DOS header, rich data, a portable executable header, code, data, import data, export data, an entry point, a beginning indication, and an end indication.

12. The method of claim 1 further comprising:
generating a plurality of representations of a plurality of files with a known classification;
processing transitions between sections in each of the plurality of files to generate a matrix or dictionary of the conditional probabilities;
comparing the plurality of files against the matrix or dictionary to generate a score range for the known classification; and
generating a score for the file based on the probabilities for each transition,
wherein classifying the file comprises classifying the file as belonging to the known classification when the score falls within the score range.

13. The method of claim 1 further comprising:
generating a classification score based on a function of a product of the probabilities for each transition,
wherein classifying the file is based on comparing the classification score against a score for one or more file classification types.

14. The method of claim 1 further comprising:
comparing each transition against conditional probabilities for a plurality of different classifications to generate a plurality of classification scores; and
classifying the file as belonging to one or more of the plurality of different classifications based on the plurality of classification scores.

15. The method of claim 1 further comprising:
determining, for each transition between more than two sequential portions, a probability of the transition between more than two sequential portions occurring in training files.

16. The method of claim 1, wherein the representation comprises tokens, and wherein the tokens comprise one or more of a letter, a number, a symbol, and a programmatic class.

17. The method of claim 1, wherein there are:
a plurality of models that each include conditional probabilities in a separate and distinct matrix or dictionary and which each model correspond to a different type of file;
the file is scored by each of the models; and
the file is classified as having a type corresponding to the model scoring the file with a highest or lowest value.

18. The method of claim 1, wherein the sections of the file are selected from a group consisting of: a first header, a rich data section, a second header, a beginning indication, a code section, and an end indication.

19. The method of claim 1, wherein the recursive neural network is a land change modeler (LCM).

20. A method for implementation by one or more processors forming part of at least one computing device, the method comprising:
generating a representation of a sequence of sections of a file;
determining, from a model including conditional probabilities, a probability for each transition between at least two sequential sections in the representation, the model being trained using a land change modeler (LCM) recursive neural network; and
classifying the file based on the probabilities for each transition;
wherein:
the representation comprise a string of alphanumeric characters in which each character in the string corresponds to a different section of the file within the sequence.

21. The method of claim 20 further comprising:
preventing execution of the file, when the file is classified as a malicious file.

22. The method of claim 21, wherein the malicious file comprises at least one of an adware file, a parasitic file, and a bad file.

23. The method of claim 20, wherein the classifying comprises classifying the file as one or more of an adware file, a parasitic file, a bad file, a packed file, and a good file.

24. The method of claim 20, wherein the conditional probabilities comprise measured probabilities that a first file section will be followed by a second file section.

25. The method of claim 20, wherein the conditional probabilities are generated based on training files.

26. The method of claim 20 further comprising:
determining, from a second model including probabilities, a prior probability for a first section of the file occurring first, wherein classifying the file is further based on the prior probability.

27. The method of claim 20, wherein the sequence of characters in the string are generated such that each of the characters occurs in the same order as an order of sections of the file.

28. The method of claim 20, wherein the conditional probabilities are included in a matrix or dictionary stored in memory, and wherein determining the probabilities for each transition comprises retrieving, for each of the transitions, a corresponding conditional probability from the matrix or dictionary.

29. The method of claim 20, wherein the conditional probabilities are generated based on Markov modeling.

30. The method of claim 20, wherein the sections of the file comprise one or more of a MAC header, a DOS header, rich data, a portable executable header, code, data, import data, export data, an entry point, a beginning indication, and an end indication.

31. The method of claim 20 further comprising:
generating a plurality of representations of a plurality of files with a known classification;
processing transitions between sections in each of the plurality of files to generate a matrix or dictionary of the conditional probabilities;
comparing the plurality of files against the matrix or dictionary to generate a score range for the known classification; and
generating a score for the file based on the probabilities for each transition,
wherein classifying the file comprises classifying the file as belonging to the known classification when the score falls within the score range.

32. The method of claim 20 further comprising:
generating a classification score based on a function of a product of the probabilities for each transition,
wherein classifying the file is based on comparing the classification score against a score for one or more file classification types.

33. The method of claim 20 further comprising:
comparing each transition against conditional probabilities for a plurality of different classifications to generate a plurality of classification scores; and
classifying the file as belonging to one or more of the plurality of different classifications based on the plurality of classification scores.

34. The method of claim 20 further comprising:
determining, for each transition between more than two sequential portions, a probability of the transition between more than two sequential portions occurring in training files.

35. The method of claim 20, wherein the representation comprises tokens, and wherein the tokens comprise one or more of a letter, a number, a symbol, and a programmatic class.

36. The method of claim 20, wherein there are:
a plurality of models that each include conditional probabilities in a separate and distinct matrix or dictionary and which each model correspond to a different type of file;
the file is scored by each of the models; and
the file is classified as having a type corresponding to the model scoring the file with a highest or lowest value.

37. The method of claim 20, wherein the sequence of the sections of the file are arranged according to a virtual ordering, the virtual ordering representing an order in which the sections of the file will occur in memory, the generated sequence of the sections of the file being different than an order in which at least a portion of the sections occur within the file when not executing.

38. The method of claim 20, wherein the sections of the file are selected from a group consisting of: a first header, a rich data section, a second header, a beginning indication, a code section, and an end indication.

* * * * *